(12) United States Patent
Astiz (10) Patent No.: US 10,346,448 B2
(45) Date of Patent: Jul. 9, 2019

(54) SYSTEM AND METHOD FOR CLASSIFYING AN ALPHANUMERIC CANDIDATE IDENTIFIED IN AN EMAIL MESSAGE

(71) Applicant: Google LLC, Mountain View, CA (US)

(72) Inventor: Mikel Astiz, Munich (DE)

(73) Assignee: Google LLC, Mountain View, CA (US)

( * ) Notice: Subject to any disclaimer, the term of this patent is extended or adjusted under 35 U.S.C. 154(b) by 268 days.

(21) Appl. No.: 15/209,424

(22) Filed: Jul. 13, 2016

(65) Prior Publication Data

US 2018/0018387 A1 Jan. 18, 2018

(51) Int. Cl.

| G06F 7/00 | (2006.01) |
| G06F 17/30 | (2006.01) |
| G06F 16/31 | (2019.01) |
| H04L 12/58 | (2006.01) |
| G06F 16/35 | (2019.01) |

(52) U.S. Cl.
CPC .............. *G06F 16/31* (2019.01); *G06F 16/35* (2019.01); *H04L 51/14* (2013.01); *H04L 51/22* (2013.01)

(58) Field of Classification Search
CPC ......... G06F 17/30613; G06F 17/30705; H04L 51/22
USPC ....................................................... 707/755
See application file for complete search history.

(56) References Cited

U.S. PATENT DOCUMENTS

| 7,158,980 B2 | 1/2007 | Shen |
| 8,630,989 B2 | 1/2014 | Blohm et al. |
| 8,825,471 B2 | 9/2014 | Betz et al. |
| 8,832,205 B2 | 9/2014 | Nelson et al. |
| 9,208,179 B1 * | 12/2015 | Song ........................ G06F 16/20 |
| 2007/0208618 A1 * | 9/2007 | Paintin .................... G06Q 30/02 705/14.11 |
| 2009/0299974 A1 * | 12/2009 | Kataoka ............ G06F 16/90344 |
| 2010/0332358 A1 * | 12/2010 | Owens ................. G06Q 10/087 705/28 |
| 2012/0054135 A1 | 3/2012 | Salaka et al. |
| 2012/0096499 A1 * | 4/2012 | Dasher ............... H04N 21/4223 725/87 |
| 2012/0150606 A1 * | 6/2012 | Navar ................ G06Q 20/3829 705/14.25 |

(Continued)

*Primary Examiner* — Binh V Ho (74) *Attorney, Agent, or Firm* — Dority & Manning, P.A.

(57) ABSTRACT

A technique for classifying an alphanumeric candidate in an email message can include receiving and parsing a plurality of email messages to identify at least one alphanumeric candidate. For each particular alphanumeric candidate, the technique can include: (i) associating the particular alphanumeric candidate with an originating email in which the particular alphanumeric candidate was identified, and (ii) determining email specific, recipient specific, and recipient agnostic features pertaining to the particular alphanumeric candidate. The alphanumeric candidates can be clustered based on the email specific, the recipient specific, and the recipient agnostic features to generate a plurality of clusters, with which an alphanumeric candidate type can be associated. The technique can include training an alphanumeric candidate type classifier based on the plurality of clusters and the associated alphanumeric candidate types, which can be utilized to determine the type of an unclassified alphanumeric candidate in a later received email message.

20 Claims, 4 Drawing Sheets

(56) References Cited

U.S. PATENT DOCUMENTS

| | | | |
|---|---|---|---|
| 2013/0074194 A1* | 3/2013 | White | H04L 51/24 726/28 |
| 2013/0179516 A1* | 7/2013 | Tsai | G06Q 10/107 709/206 |
| 2015/0032824 A1 | 1/2015 | Kumar et al. | |
| 2015/0235174 A1* | 8/2015 | Hall | G07C 9/00896 705/333 |
| 2015/0256499 A1* | 9/2015 | Kumar | G06F 16/958 709/206 |
| 2016/0055684 A1* | 2/2016 | Chen | G07C 5/0808 701/31.6 |
| 2016/0149845 A1* | 5/2016 | Rawat | G06Q 10/107 707/755 |
| 2016/0171093 A1* | 6/2016 | Benati | H04L 51/08 707/755 |
| 2017/0161372 A1* | 6/2017 | Fern ndez | G06F 17/218 |

\* cited by examiner

SYSTEM AND METHOD FOR CLASSIFYING AN ALPHANUMERIC CANDIDATE IDENTIFIED IN AN EMAIL MESSAGE

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A user of an email messaging service will often receive emails that include various types of alphanumeric strings. For example only, a user may receive emails that include a loyalty number (e.g., a frequent shopper number), a frequent flyer number, a flight or other reservation number, an order number, a tracking number, a coupon code, or an account number. These alphanumeric strings may be long or short, but often are difficult for the user to remember as each of the different types may have a different format, utilize a combination of letters and numbers, and/or tend to appear somewhat randomized (in that the alphabetic characters tend not to spell out a known word of the user).

SUMMARY

A technique for classifying an alphanumeric candidate identified in an email message is disclosed. The technique can include receiving a plurality of email messages. Each of the plurality of email messages can comprise text and a subject and be associated with a sender and a recipient. The technique can also include parsing each of the plurality of email messages to identify at least one alphanumeric candidate. For each particular alphanumeric candidate, the technique can include (i) associating the particular alphanumeric candidate with an originating email in which the particular alphanumeric candidate was identified, (ii) determining email specific features related to the particular alphanumeric candidate, (iii) analyzing the plurality of email messages to determine recipient specific features pertaining to the particular alphanumeric candidate, and (iv) analyzing the plurality of email messages to determine recipient agnostic features pertaining to the particular alphanumeric candidate. The email specific features can be features of the originating email and include a position in the originating email at which the particular alphanumeric candidate is located, and one or more words preceding the particular alphanumeric candidate. The recipient specific features can be related to use of the particular alphanumeric candidate in other emails of the plurality of emails having a same recipient as the originating email. The recipient agnostic features can be related to use of the particular alphanumeric candidate in emails of the plurality of emails not having the same recipient as the originating email.

The technique can further include clustering the alphanumeric candidates based on the email specific features, the recipient specific features, and the recipient agnostic features to generate a plurality of clusters. The alphanumeric candidates in each particular cluster of the plurality of clusters can be more similar to each other than to other alphanumeric candidates in other clusters. Additionally, the technique can include associating an alphanumeric candidate type with each of the plurality of clusters and training an alphanumeric candidate type classifier based on the plurality of clusters and the associated alphanumeric candidate types. Furthermore, the technique can include utilizing the alphanumeric candidate type classifier to determine the type of an unclassified alphanumeric candidate in a later received email message.

In addition to the above, the present disclosure is directed to a computing device and a computing system for performing the above techniques. Also disclosed is a non-transitory computer-readable storage medium having a plurality of instructions stored thereon, which, when executed by one or more processors, cause the one or more processors to perform the operations of the above techniques.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

As briefly mentioned above, a user of an email messaging service may receive emails that contain alphanumeric strings of various types. For example only, a user may receive a monthly email that includes a loyalty or membership number for a particular merchant, or may receive a flight reservation email that includes a flight number for a future trip. The user may not be able to remember these alphanumeric strings without consulting an email or other record of the alphanumeric string. Thus, when a user desires to know a particular alphanumeric string, a user may have to search her/his email service for a particular email (or emails) and review the contents of one or more located emails in an attempt to identify the appropriate alphanumeric strings.

As an example, a user may be making a flight reservation via his/her computing device. As part of the reservation process, the user may be asked to enter her/his frequent flyer number, which the user has not memorized. The user may, however, recall that she/he receives a monthly newsletter email that includes her/his frequent flyer number. Thus, the user may attempt to search his/her email messages to locate one of the monthly newsletter emails, which can then be opened and reviewed in an attempt to identify the user's frequent flyer number.

It would be desirable to provide a system and method for extracting alphanumeric candidates from the email of a user and for automatically classifying the alphanumeric candidates as a particular type of alphanumeric string. In this manner, each alphanumeric candidate can be automatically associated with a particular type of alphanumeric string and stored such that a user can be prompted with the proper alphanumeric candidate when appropriate for the user. The present disclosure is directed to such a system and method, as well as a non-transitory computer-readable medium that stores instructions for performing the method. While not limited to such an implementation, the present disclosure may be particularly well-suited for emails from businesses or other organizations/entities that send multiple emails having the same template and/or form.

For example only, and continuing with the above described example of the frequent flyer number, instead of searching for a particular email that includes the desired alphanumeric candidate, the user may directly input a search query (via his/her email service or an associated personalized search engine) of "frequent flyer number" or the like. The user may then be presented with the alphanumeric candidate(s) that has been identified and classified as of the "frequent flyer number" type.

In order to achieve the above identified and other objectives, the present disclosure provides a system and method that receives a plurality of email messages. Each of the email messages includes text, has a subject in a subject field (which can be considered to comprise a portion of the text), and is associated with both a sender and a recipient. The plurality of email messages can, e.g., be a collection of email messages that are known to include particular types of alphanumeric candidates, each of which being labeled as such. In this manner, the plurality of email messages can be considered as labeled training data, which can be used to train a classifier, as described below.

The text of each email message can be parsed to identify one or more alphanumeric candidates. In some embodiments, an alphanumeric candidate can be identified as any string of characters that includes both letters and numerals. In alternative embodiments, an alphanumeric candidate can be identified in other manners. For each of the identified alphanumeric candidates, three different sets of features can be extracted from the plurality of email messages: email specific features, recipient specific features, and recipient agnostic features, which are described more fully below.

Email specific features of an alphanumeric candidate are determined by analyzing the particular email (the "originating email") in which the alphanumeric candidate was identified. Examples of email specific features include, but are not limited to, one or more words preceding the alphanumeric candidate, a position in the originating email at which the alphanumeric candidate is located, the subject of the originating email, and the sender of the originating email. These email specific features can be indicative of the type of the alphanumeric candidates. For example only, if a particular alphanumeric candidate is preceded by the words "tracking number" or "order number," it may be assumed that it is of the tracking number or order number type, respectively.

Recipient specific features of an alphanumeric candidate are related to use of the particular alphanumeric candidate in other emails of the plurality of emails having a same recipient as the originating email. Essentially, recipient specific features are related to the use of the same alphanumeric candidate in multiple emails having the same recipient. Accordingly, such recipient specific features can be determined by analyzing emails in the collection of emails in which the particular alphanumeric candidate is present and which share the same recipient as the originating email. These recipient specific features can be indicative of the type of the alphanumeric candidates. For example only, if a particular alphanumeric candidate has a long lifetime (e.g., it is identified in many emails with the same recipient, over a long period of time), it may be assumed that the type of the particular alphanumeric candidate corresponds to a long lifetime type (loyalty number, frequent flyer number, etc.) and is not a short lifetime type (e.g., a tracking number or order number).

Recipient agnostic features of an alphanumeric candidate are related to use of the particular alphanumeric candidate in emails of the plurality of emails not having the same recipient as the originating email. Essentially, recipient agnostic features are related to the use of the same alphanumeric candidate in multiple emails having different recipients, e.g., how shared is the alphanumeric candidate. Accordingly, such recipient agnostic features can be determined by analyzing emails in the collection of emails in which the particular alphanumeric candidate is present and which have a different recipient as the originating email. These recipient agnostic features can be indicative of the type of the alphanumeric candidates. For example only, if a particular alphanumeric candidate is widely shared among different recipients (e.g., it is identified in many emails with different recipients), it may be assumed that the type of the particular alphanumeric candidate corresponds to a shared type (flight number, coupon code, etc.) and is not a user specific type (e.g., a frequent flyer number, tracking number or order number).

The alphanumeric candidates can then be clustered based on the email specific features, the recipient specific features, and the recipient agnostic features to generate a plurality of clusters. Any clustering analysis or algorithm can be utilized to group the alphanumeric candidates into clusters. The clusters are generated such that the alphanumeric candidates in each particular cluster of the plurality of clusters are more similar to each other than to other alphanumeric candidates in other clusters. Ideally, the generated clusters should contain alphanumeric candidates having the same type. In this manner, an alphanumeric candidate type can be associated with each of the plurality of clusters (the clusters are "labeled"), and an alphanumeric candidate type classifier can be trained on the plurality of (labeled) clusters and the associated alphanumeric candidate types (labels). The trained alphanumeric candidate type classifier can be utilized to determine a type of an unclassified alphanumeric candidate in a later received email message, e.g., by analyzing the unclassified alphanumeric candidate to determine the cluster to which it should be assigned and assigning the associated alphanumeric candidate type (label) for that cluster to the unclassified alphanumeric candidate.

Figure 1:
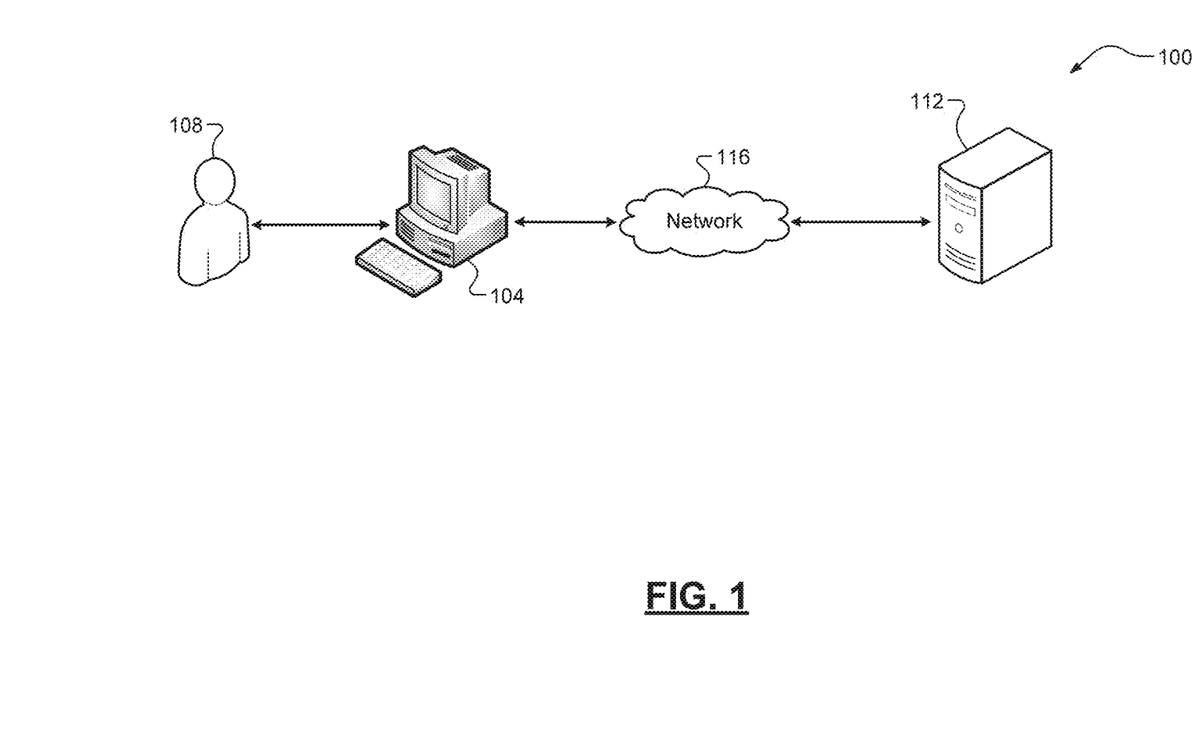
FIG. 1 is a diagram of an example computing system including an example computing device and an example server according to some implementations of the present disclosure.

Referring now to FIG. 1, a diagram of an example computing system 100 according to some implementations of the present disclosure is illustrated. The computing system 100 can include a client computing device 104 associated with a user 108. The client computing device 104 can be any suitable computing device (a desktop computer, a laptop computer, a tablet computer, a mobile phone, etc.). The client computing device 104 can communicate with a server computing device 112 via a network 116. The network 116 can be a local area network (LAN), a wide area network (WAN), e.g., the Internet, or a combination thereof. The term "server computing device" as used herein can refer to both a single server computing device and two or more server computing devices operating in a parallel or distributed architecture. For example only, a classifier or other machine learning model may be distributed over a plurality of server computing devices 112.

Figure 2:
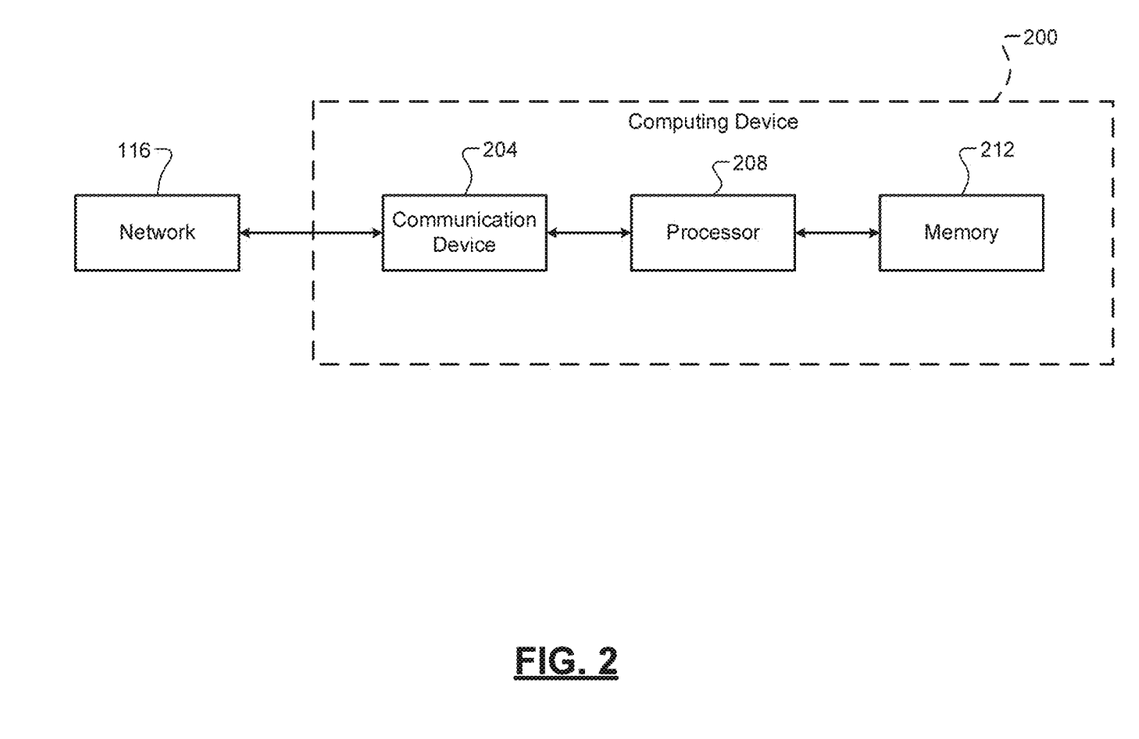
FIG. 2 is a functional block diagram of the example computing device of FIG. 1.

Referring now to FIG. 2, an example computing device 200 is illustrated. In one implementation, the computing device 200 can include a communication device 204, a processor 208, and a memory 212. For purposes of this disclosure, the computing device 200 can represent the client computing device 104 and/or the server computing device 112. It will be appreciated, however, that these devices 104, 112 may have a different configuration and/or may include additional components (various input/output devices, such as a microphone, a camera, etc.). The communication device 204 can be any suitable device (e.g., a transceiver) configured for communication via the network 116. The memory 212 can be any suitable storage medium (flash, hard disk, etc.) configured to store information at the computing device 200, such as a set of instructions for execution by the processor 208. The term "processor" as used herein can refer to both a single processor and two or more processors operating in a parallel or distributed architecture. When executed by the processor 208, the set of instructions can cause the computing device 200 to perform at least a portion of the techniques of the present disclosure.

Figure 3:
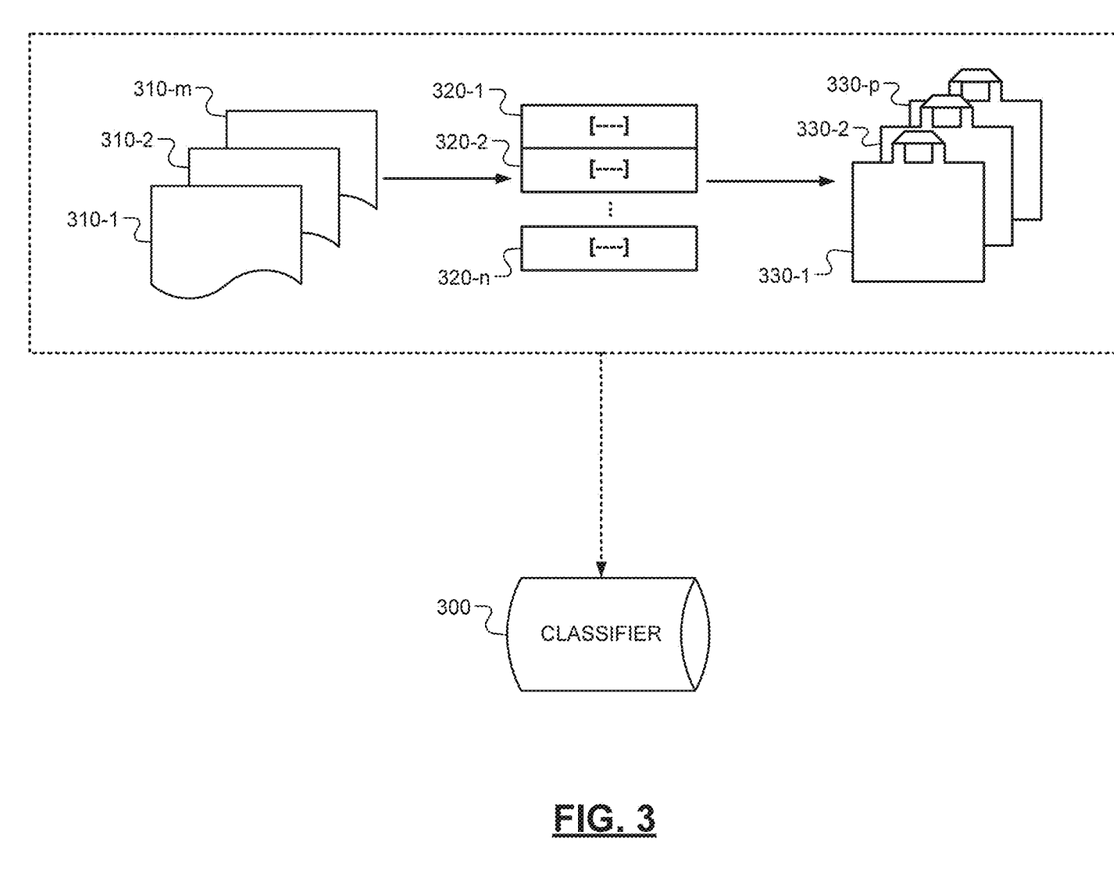
FIG. 3 is a schematic block diagram of an example technique for training an alphanumeric candidate type classifier according to some implementations of the present disclosure.

With further reference to FIG. 3, and as mentioned above, the present disclosure is directed to a technique for training and utilizing a classifier 300 that determines the type of an alphanumeric candidate in an electronic communication (e.g., email) of a user 108. The technique can be performed by one or more computing devices, such as the client computing device 104, the server computing device 112, or a combination thereof. For ease of description, the technique will be described herein as being performed by the computing device 200.

The computing device 200 can receive a plurality of email messages 310-1, 310-2, . . . 310-$m$ (referred to herein individually and collectively as "email message(s) 310"). The computing device 200 can parse each of the email messages 310 to identify one or more alphanumeric candidates 320-1, 320-2, . . . 320-$n$ (referred to herein individually and collectively as "alphanumeric candidate(s) 320") therein.

The plurality of email messages 310 can be a collection of email messages that are known to include particular types of alphanumeric candidates 320. Each of the alphanumeric candidates 320 in the email messages 310 can be identified (or "labeled") as a particular type of alphanumeric candidate 320. Example types of alphanumeric candidates include, but are not limited to, a tracking number, an order number, a loyalty number, a frequent flyer number, a flight number, and a coupon code. In this manner, the plurality of email messages 310 can be considered as labeled training data, which can be used to train the classifier 300.

Features for each alphanumeric candidate 320 can be determined by the computing device 200. For example only, the computing device 200 can associate each particular alphanumeric candidate 320 with the particular email (referred to herein as the "originating email") in which the alphanumeric candidate was identified. Various features of the alphanumeric candidate 320 and its associated originating email 310 can be determined by the computing device 200. These features can be referred to as "email specific features" because each relates to features of the particular alphanumeric candidate 320 with respect to the originating email 310. Examples of email specific features include, but are not limited to, one or more words preceding the alphanumeric candidate 320, a position in the originating email at which the alphanumeric candidate 320 is located (e.g., the xpath or the position in the HTML tree of the candidate), the subject of the originating email, and the sender of the originating email. As mentioned above, email specific features can be indicative of the type of an alphanumeric candidate 320.

Additionally or alternatively, the computing device 200 can analyze the plurality of email messages 310 to determine features related to the use of the same particular alphanumeric candidate 320 in multiple emails having the same recipient. These features can be referred to as "recipient specific features" of an alphanumeric candidate 320 and are related to use of the particular alphanumeric candidate 320 in other emails 310 of the plurality of emails 320 having a same recipient as the originating email. Similar to the email specific features described above, the recipient specific features can be indicative of the type of an alphanumeric candidate 320.

Different types of recipient specific features can be utilized by the computing device 200. For example only, the recipient specific features can include a lifetime of a particular alphanumeric candidate 320. The lifetime of a particular alphanumeric candidate 320 can, e.g., refer to a time difference between a first email 310 and a last email 310 in which the particular alphanumeric candidate 320 is identified with the same recipient as the originating email 320. In additional or alternative embodiments, the recipient specific features can include a number of emails in which a particular alphanumeric candidate 320 is identified with the same recipient as the originating email. Other recipient specific features can include, but are not limited to, whether or not the particular alphanumeric candidate 320 has been observed in a partially obfuscated form, and a location in the email messages 310 where the particular alphanumeric candidate 320 is typically observed. As yet another example, a recipient specific feature can include a consistency value representative of a level of consistency in use of the particular alphanumeric candidate 320, e.g., whether different alphanumeric candidates 320 are observed for a particular user 108 over the plurality of emails 310. Other features are contemplated.

In some embodiments, the computing device 200 can also or alternatively analyze the plurality of email messages 310 to determine features related to the use of the same alphanumeric candidate 320 in multiple emails having different recipients, e.g., how shared is the alphanumeric candidate 320. These features can be referred to as "recipient agnostic features" of an alphanumeric candidate 320 and are related to use of the particular alphanumeric candidate 320 in emails 310 of the plurality of emails 310 not having the same recipient as the originating email. Similar to the email specific features and recipient specific features described above, the recipient agnostic features can be indicative of the type of an alphanumeric candidate 320.

Different types of recipient agnostic features can be utilized by the computing device 200. For example only, the recipient agnostic features can include a degree of sharing of a particular alphanumeric candidate 320. The degree of sharing can, e.g., be representative of a number of emails in which the particular alphanumeric candidate 320 is identified with a different recipient from the originating email 310, or a number of users (other than the recipient of the originating email 310) that have received an email 310 that contains the particular alphanumeric candidate 320. Other recipient specific features can include, but are not limited to, an average number of characters (letters, numbers) of a particular alphanumeric candidate type across all users, and an average ratio of numbers to letters of a particular alphanumeric candidate type across all users. Other features are contemplated.

The computing device 200 can utilize one or more of the email specific features, the recipient specific features, and the recipient agnostic features to cluster the alphanumeric candidates 320 and thereby generate a plurality of clusters 330-1, 330-2, . . . 330-*p* (referred to herein individually and collectively as "cluster(s) 330"). As mentioned above, any clustering analysis or algorithm can be utilized to group the alphanumeric candidates 320 into clusters 330 and the clusters should be generated such that the alphanumeric candidates 320 in each particular cluster 330 of the plurality of clusters 330 are more similar to each other than to other alphanumeric candidates 320 in other clusters 330.

The clustering process may generate clusters 320 that contain alphanumeric candidates 320 having the same type. In this manner, an alphanumeric candidate type can be associated with each of the plurality of clusters 330 such that the clusters 330 are "labeled" as relating to a particular type of alphanumeric candidate 320. More specifically, the computing device 200 can associate an alphanumeric candidate type with each of the plurality of clusters 330 to label the cluster 330. In some embodiments, the association of an alphanumeric candidate type with each of the plurality of clusters 330 can be performed by the computing device 200 selecting the dominant alphanumeric candidate type in each cluster 330. In other aspects, a human operator can assist with the association process, e.g., by confirming the associations made by the computing device 200 and/or manually labeling specific clusters 330 or alphanumeric candidates 320. In further aspects, the plurality of email messages 310 can comprise labeled training data in which each alphanumeric candidate 320 is labeled with a particular alphanumeric candidate type, and the computing device 200 utilizes the labeled training data to assign an alphanumeric candidate type to each of the plurality of clusters 330.

An alphanumeric candidate type classifier 330 can be trained on the plurality of clusters 330 and the associated alphanumeric candidate types. The trained alphanumeric candidate type classifier 300 can be utilized to determine a type of an unclassified alphanumeric candidate 320 in a later received email message 310, e.g., by analyzing the unclassified alphanumeric candidate 320 to determine the cluster 330 to which it should be assigned and assigning the associated alphanumeric candidate type for that cluster 330 to the unclassified alphanumeric candidate 320. For example only, the user 108 may directly input a search query (via his/her email service or an associated personalized search engine) representative of the type of a particular alphanumeric candidate 320 ("frequent flyer number," "order number," etc.) and the user 108 may then be presented with the alphanumeric candidate(s) 320 that have been identified and classified as of the type queried. In some embodiments, the computing device 200 stores the various alphanumeric candidates 320 of the user 108 and their respective types (e.g., in the memory 212 or elsewhere) for later retrieval and output.

Figure 4:
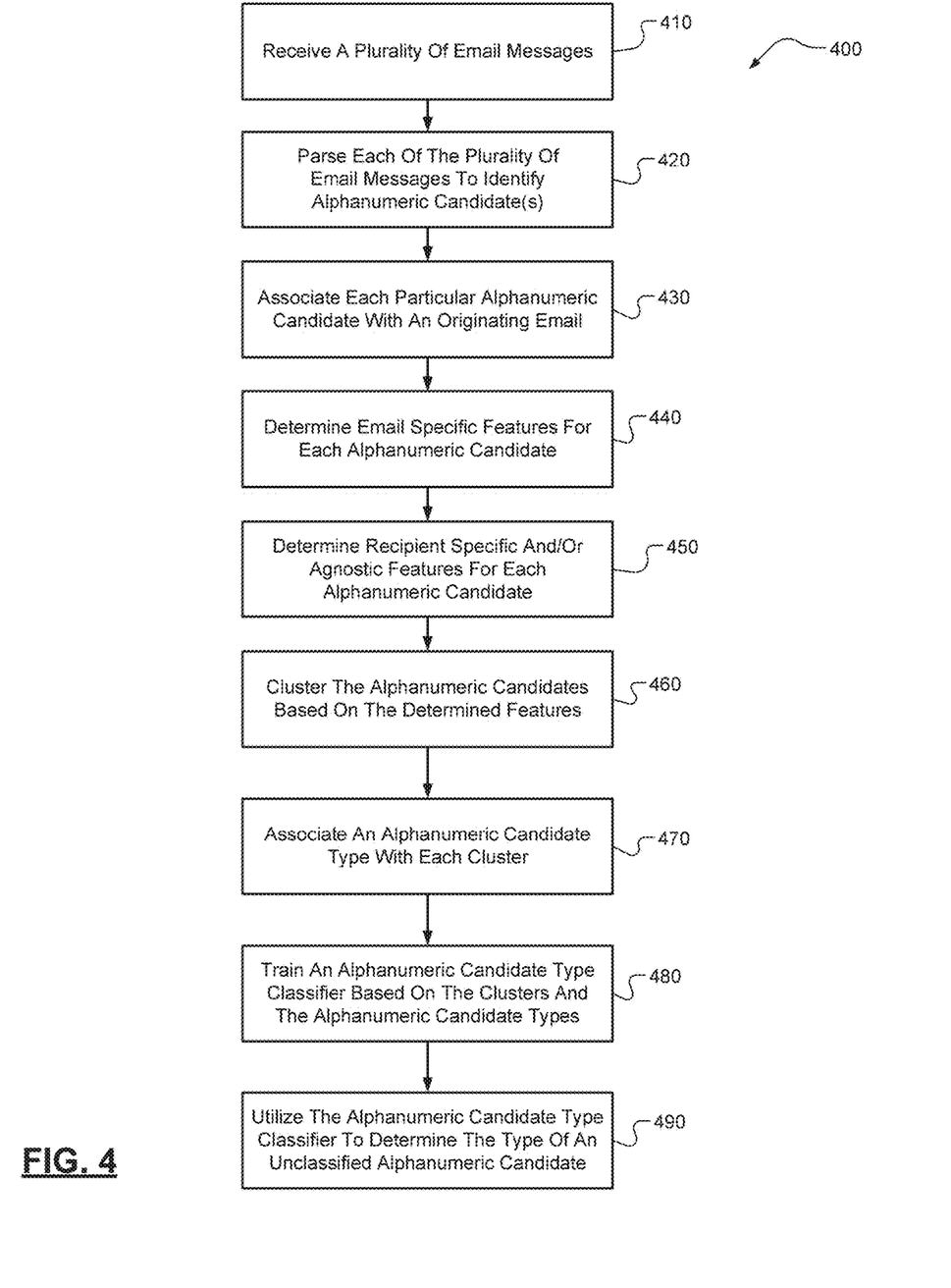
FIG. 4 is a flow diagram of an example technique for classifying an alphanumeric candidate identified in an email message according to some implementations of the present disclosure.

Referring now to FIG. 4, a flow diagram of an example technique 400 for classifying an alphanumeric candidate identified in an email message is illustrated. While the technique 400 will be described below as being performed by a computing device 200, it should be appreciated that the technique 400 can be performed, in whole or in part, at another or more than one computing device and/or the server 112 described above.

At 410, the computing device 200 can receive a plurality of email messages 310. The computing device 200 can further parse each of the plurality of email messages 310 to identify at least one alphanumeric candidate 320 at 420. The computing device 200 can further associate (at 430) each particular alphanumeric candidate 320 with an originating email 310, that is, the email 310 in which the particular alphanumeric candidate 320 was identified.

The computing device 200 can then determine features of each particular alphanumeric candidate 320. At 430, the computing device 200 can associate each particular alphanumeric candidate 320 with an originating email 310. Further, at 440 the computing device 200 can determine email specific features related to each particular alphanumeric candidate 320. As described above, the email specific features can be features of the originating email 310 and can include, e.g., a position in the originating email 310 at which the alphanumeric candidate 320 is located (e.g., the xpath or the position in the HTML tree of the candidate), and one or more words preceding the alphanumeric candidate 320.

The computing device 200 can also or alternatively, at 450, determine recipient specific features and/or recipient agnostic features for each alphanumeric candidate 320. As described above, the recipient specific features for an alphanumeric candidate 320 can be related to use of the particular alphanumeric candidate 320 in other emails 310 of the plurality of emails 310 having a same recipient as the originating email 310. Further, the recipient agnostic features for an alphanumeric candidate 320 can be related to use of the particular alphanumeric candidate 320 in emails 310 of the plurality of emails 310 not having the same recipient as the originating email 310.

At 460, the computing device 200 can cluster the alphanumeric candidates 320 based on the various determined features (the email specific features, the recipient specific features, and/or the recipient agnostic features) to generate a plurality of clusters 330. As described above, any clustering analysis or algorithm can be utilized to cluster the alphanumeric candidates 320 into clusters 330 and the clusters 330 can be generated such that the alphanumeric candidates 320 in each particular cluster 330 of the plurality of clusters 330 are more similar to each other than to other alphanumeric candidates 320 in other clusters 330. The computing device 200 can associate an alphanumeric candidate type with each of the plurality of clusters 330 at 470. The computing device 200 (at 480) can train an alphanumeric candidate type classifier based on the plurality of clusters 330 and their associated alphanumeric candidate types. The trained alphanumeric candidate type classifier 300 can then be utilized at 490 to determine a type of an unclassified alphanumeric candidate 320 in a later received email message 310, as more fully described above.

Further to the descriptions above, a user (such as user 108) may be provided with controls allowing the user to make an election as to both if and when systems, programs or features described herein may enable collection of user information (e.g., information about a user's current location, or information relating to a user's various alphanumeric candidates), and if the user is sent content or communications from a server. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how that information is used, and what information is provided to the user.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method, comprising:
receiving, at a computing device having one or more processors, a plurality of email messages, each of the plurality of email messages comprising text and a subject and being associated with a sender and a recipient;
parsing, at the computing device, each of the plurality of email messages to identify at least one alphanumeric candidate;
for each particular alphanumeric candidate:
associating, at the computing device, the particular alphanumeric candidate with an originating email in which the particular alphanumeric candidate was identified,
determining, at the computing device, email specific features related to the particular alphanumeric candidate, the email specific features being features of the originating email and including a position in the originating email at which the particular alphanumeric candidate is located, and one or more words preceding the particular alphanumeric candidate,
analyzing, at the computing device, the plurality of email messages to determine recipient specific features pertaining to the particular alphanumeric candidate, recipient specific features being related to use of the particular alphanumeric candidate in other emails of the plurality of emails having a same recipient as the originating email, and
analyzing, at the computing device, the plurality of email messages to determine recipient agnostic features pertaining to the particular alphanumeric candidate, recipient agnostic features being related to use of the particular alphanumeric candidate in emails of the plurality of emails not having the same recipient as the originating email;
clustering, at the computing device, the alphanumeric candidates based on the email specific features, the recipient specific features, and the recipient agnostic features to generate a plurality of clusters, wherein the alphanumeric candidates in each particular cluster of the plurality of clusters are more similar to each other than to other alphanumeric candidates in other clusters;
associating, at the computing device, an alphanumeric candidate type with each of the plurality of clusters;
training, at the computing device, an alphanumeric candidate type classifier based on the plurality of clusters and the associated alphanumeric candidate types; and
utilizing, at the computing device, the alphanumeric candidate type classifier to determine the type of an unclassified alphanumeric candidate in a later received email message.

2. The computer-implemented method of claim 1, wherein the email specific features further include at least one of the subject of the originating email, and the sender of the originating email.

3. The computer-implemented method of claim 1, wherein the recipient specific features include a lifetime of the particular alphanumeric candidate representative of a time difference between a first email and a last email in which the particular alphanumeric candidate is identified with the same recipient as the originating email.

4. The computer-implemented method of claim 1, wherein the recipient specific features include a number of emails in which the particular alphanumeric candidate is identified with the same recipient as the originating email.

5. The computer-implemented method of claim 1, wherein the recipient agnostic features include a degree of sharing of the particular alphanumeric candidate, wherein the degree of sharing is representative of a number of emails in which the particular alphanumeric candidate is identified with a different recipient from the originating email.

6. The computer-implemented method of claim 1, wherein:
the plurality of email messages comprises labeled training data in which each alphanumeric candidate in the plurality of email messages is labeled with a particular alphanumeric candidate type; and
associating the alphanumeric candidate type with each of the plurality of clusters comprises utilizing the labeled training data to assign the alphanumeric candidate type to each of the plurality of clusters.

7. The computer-implemented method of claim 1, wherein the type of an unclassified alphanumeric candidate comprises one of a tracking number, an order number, a loyalty number, a frequent flyer number, a flight number, and a coupon code.

8. A computing device, comprising:
one or more processors; and
a non-transitory computer-readable storage medium having a plurality of instructions stored thereon, which, when executed by the one or more processors, cause the one or more processors to perform operations comprising:
receiving a plurality of email messages, each of the plurality of email messages comprising text and a subject and being associated with a sender and a recipient;
parsing each of the plurality of email messages to identify at least one alphanumeric candidate;
for each particular alphanumeric candidate:
associating the particular alphanumeric candidate with an originating email in which the particular alphanumeric candidate was identified,
determining email specific features related to the particular alphanumeric candidate, the email specific features being features of the originating email and including a position in the originating email at which the particular alphanumeric candidate is located, and one or more words preceding the particular alphanumeric candidate, analyzing the plurality of email messages to determine recipient specific features pertaining to the particular alphanumeric candidate, recipient specific features being related to use of the particular alphanumeric candidate in other emails of the plurality of emails having a same recipient as the originating email, and analyzing the plurality of email messages to determine recipient agnostic features pertaining to the particular alphanumeric candidate, recipient agnostic features being related to use of the particular alphanumeric candidate in emails of the plurality of emails not having the same recipient as the originating email;

clustering the alphanumeric candidates based on the email specific features, the recipient specific features, and the recipient agnostic features to generate a plurality of clusters, wherein the alphanumeric candidates in each particular cluster of the plurality of clusters are more similar to each other than to other alphanumeric candidates in other clusters;

associating an alphanumeric candidate type with each of the plurality of clusters;

training an alphanumeric candidate type classifier based on the plurality of clusters and the associated alphanumeric candidate types; and utilizing the alphanumeric candidate type classifier to determine the type of an unclassified alphanumeric candidate in a later received email message.

9. The computing device of claim 8, wherein the email specific features further include at least one of the subject of the originating email, and the sender of the originating email.

10. The computing device of claim 8, wherein the recipient specific features include a lifetime of the particular alphanumeric candidate representative of a time difference between a first email and a last email in which the particular alphanumeric candidate is identified with the same recipient as the originating email.

11. The computing device of claim 8, wherein the recipient specific features include a number of emails in which the particular alphanumeric candidate is identified with the same recipient as the originating email.

12. The computing device of claim 8, wherein the recipient agnostic features include a degree of sharing of the particular alphanumeric candidate, wherein the degree of sharing is representative of a number of emails in which the particular alphanumeric candidate is identified with a different recipient from the originating email.

13. The computing device of claim 8, wherein:
the plurality of email messages comprises labeled training data in which each alphanumeric candidate in the plurality of email messages is labeled with a particular alphanumeric candidate type; and
associating the alphanumeric candidate type with each of the plurality of clusters comprises utilizing the labeled training data to assign the alphanumeric candidate type to each of the plurality of clusters.

14. The computing device of claim 8, wherein the type of an unclassified alphanumeric candidate comprises one of a tracking number, an order number, a loyalty number, a frequent flyer number, a flight number, and a coupon code.

15. A non-transitory computer-readable storage medium having a plurality of instructions stored thereon, which, when executed by one or more processors, cause the one or more processors to perform operations comprising:

receiving a plurality of email messages, each of the plurality of email messages comprising text and a subject and being associated with a sender and a recipient;

parsing each of the plurality of email messages to identify at least one alphanumeric candidate;

for each particular alphanumeric candidate:
associating the particular alphanumeric candidate with an originating email in which the particular alphanumeric candidate was identified,
determining email specific features related to the particular alphanumeric candidate, the email specific features being features of the originating email and including a position in the originating email at which the particular alphanumeric candidate is located, and one or more words preceding the particular alphanumeric candidate,
analyzing the plurality of email messages to determine recipient specific features pertaining to the particular alphanumeric candidate, recipient specific features being related to use of the particular alphanumeric candidate in other emails of the plurality of emails having a same recipient as the originating email, and
analyzing the plurality of email messages to determine recipient agnostic features pertaining to the particular alphanumeric candidate, recipient agnostic features being related to use of the particular alphanumeric candidate in emails of the plurality of emails not having the same recipient as the originating email;

clustering the alphanumeric candidates based on the email specific features, the recipient specific features, and the recipient agnostic features to generate a plurality of clusters, wherein the alphanumeric candidates in each particular cluster of the plurality of clusters are more similar to each other than to other alphanumeric candidates in other clusters;

associating an alphanumeric candidate type with each of the plurality of clusters;

training an alphanumeric candidate type classifier based on the plurality of clusters and the associated alphanumeric candidate types; and utilizing the alphanumeric candidate type classifier to determine the type of an unclassified alphanumeric candidate in a later received email message.

16. The non-transitory computer-readable storage medium of claim 15, wherein the email specific features further include at least one of the subject of the originating email, and the sender of the originating email.

17. The non-transitory computer-readable storage medium of claim 15, wherein the recipient specific features include a lifetime of the particular alphanumeric candidate representative of a time difference between a first email and a last email in which the particular alphanumeric candidate is identified with the same recipient as the originating email.

18. The non-transitory computer-readable storage medium of claim 15, wherein the recipient specific features include a number of emails in which the particular alphanumeric candidate is identified with the same recipient as the originating email.

19. The non-transitory computer-readable storage medium of claim 15, wherein the recipient agnostic features include a degree of sharing of the particular alphanumeric candidate, wherein the degree of sharing is representative of a number of emails in which the particular alphanumeric candidate is identified with a different recipient from the originating email.

20. The non-transitory computer-readable storage medium of claim 15, wherein:
  the plurality of email messages comprises labeled training data in which each alphanumeric candidate in the plurality of email messages is labeled with a particular alphanumeric candidate type; and
  associating the alphanumeric candidate type with each of the plurality of clusters comprises utilizing the labeled training data to assign the alphanumeric candidate type to each of the plurality of clusters.

* * * * *